Dec. 18, 1962 K. DRENCK 3,069,547
X-RAY APPARATUS
Filed Jan. 25, 1955 9 Sheets-Sheet 1
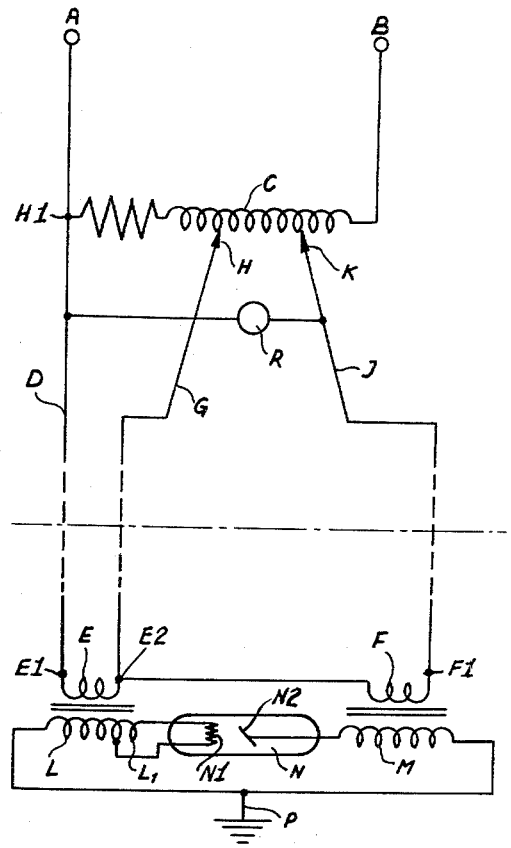
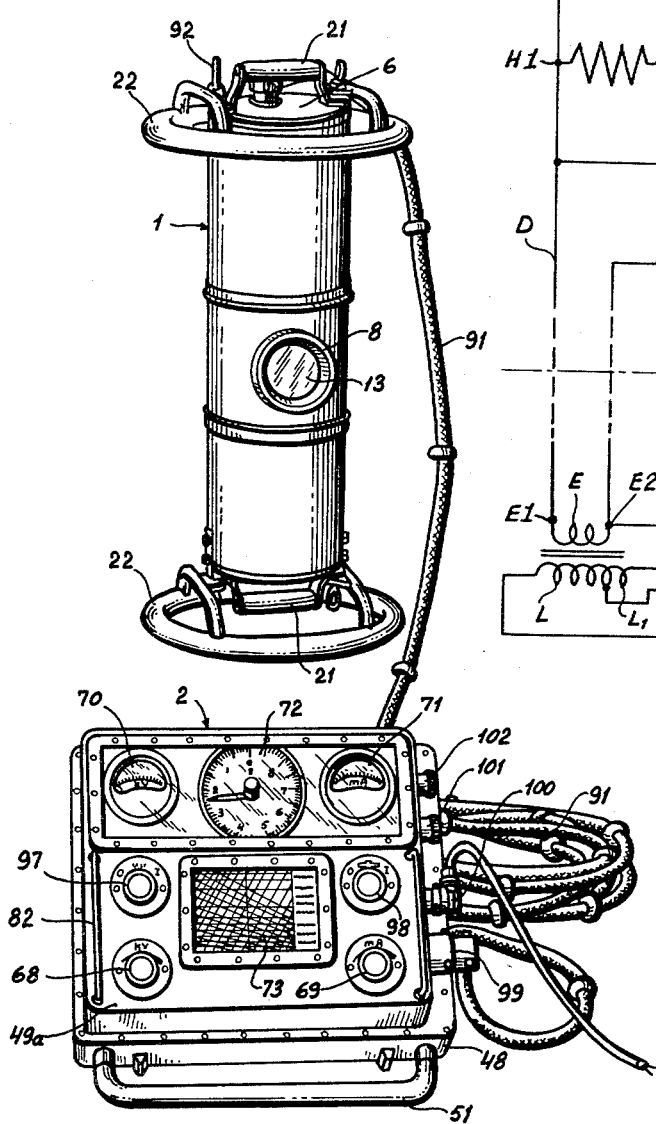

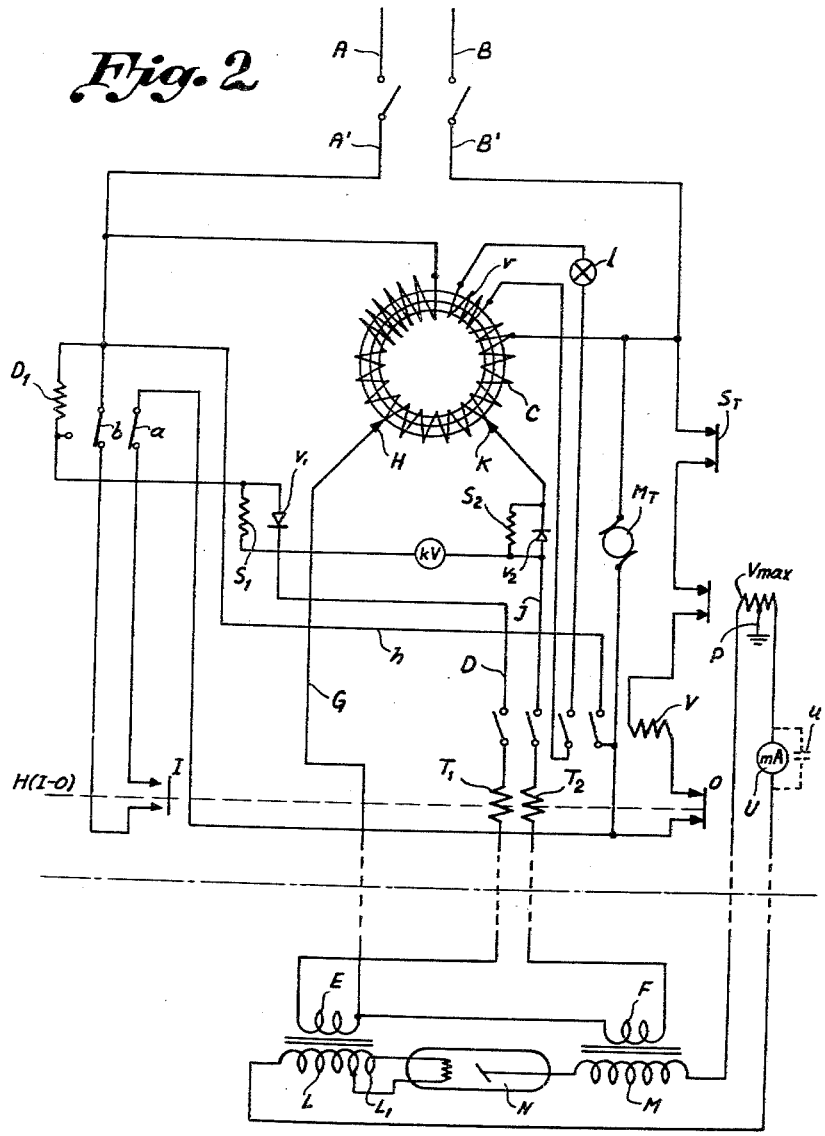

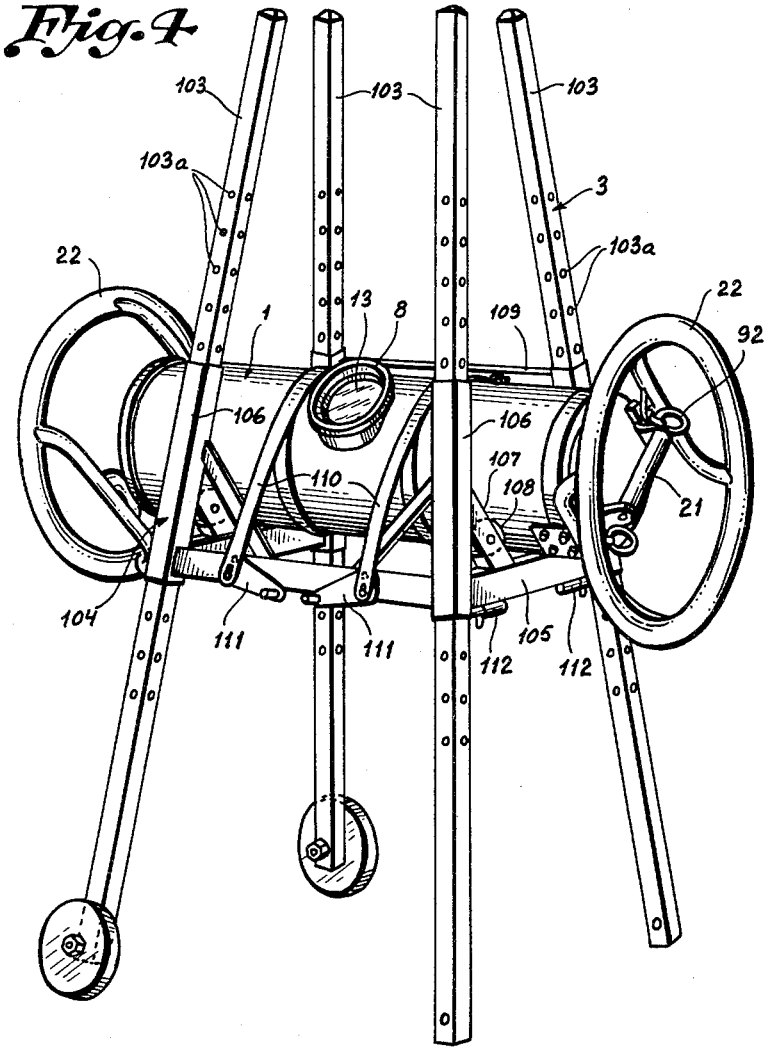

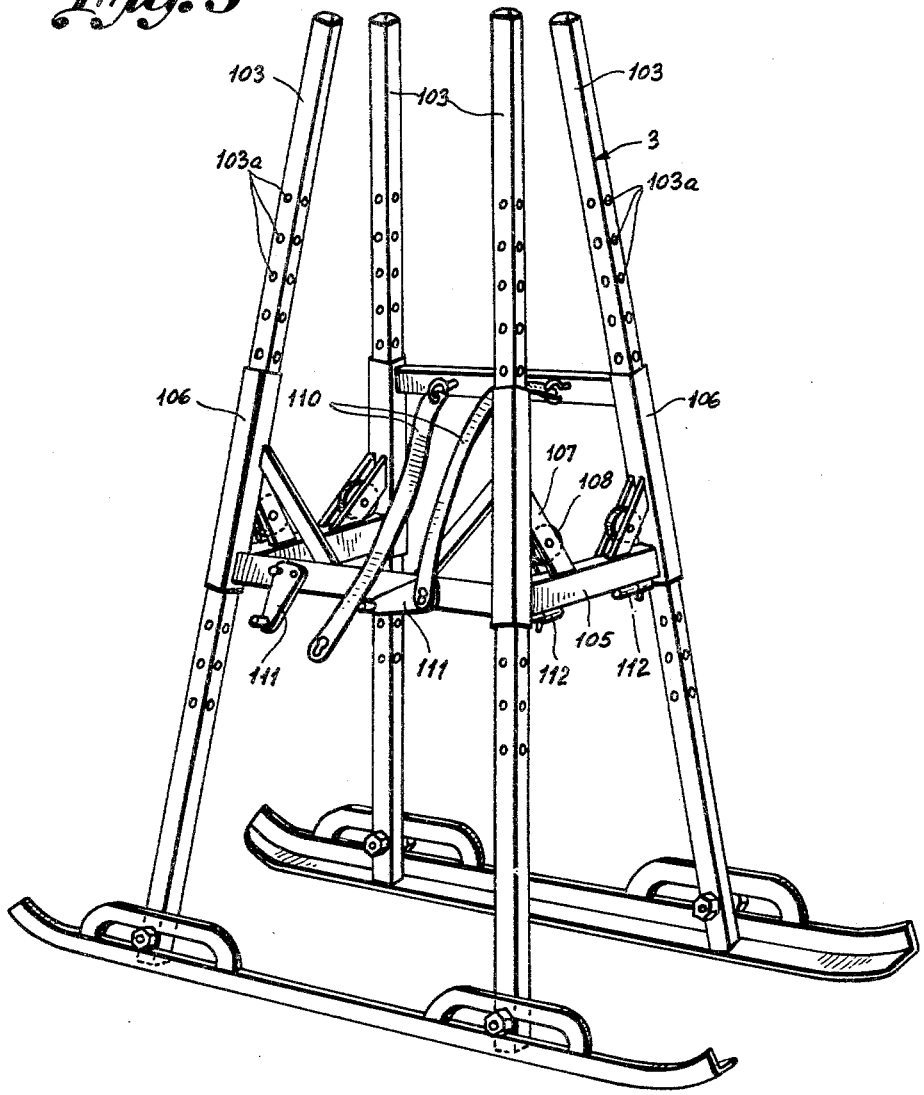

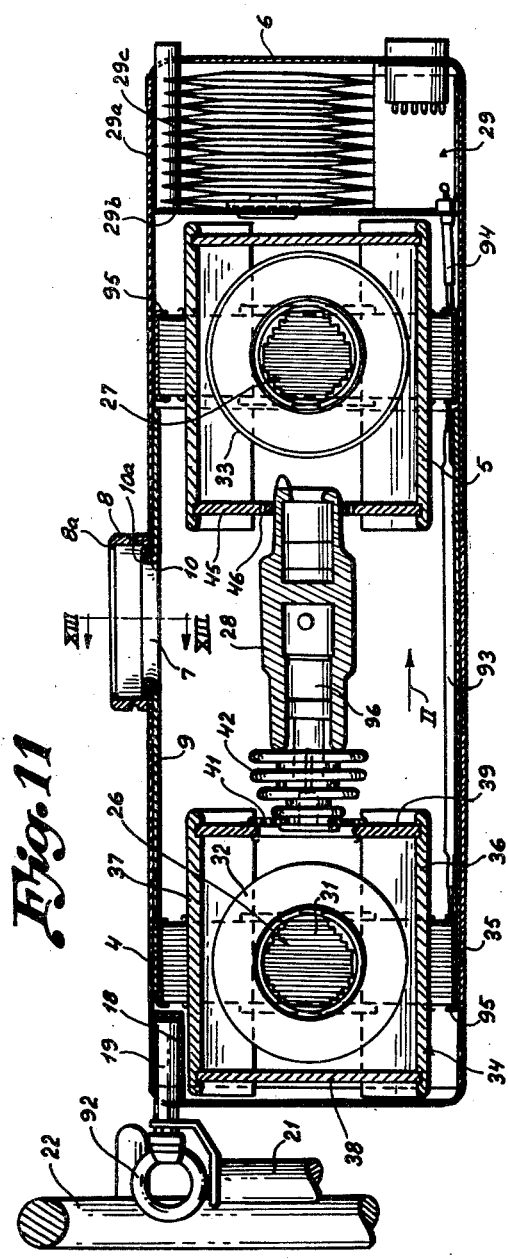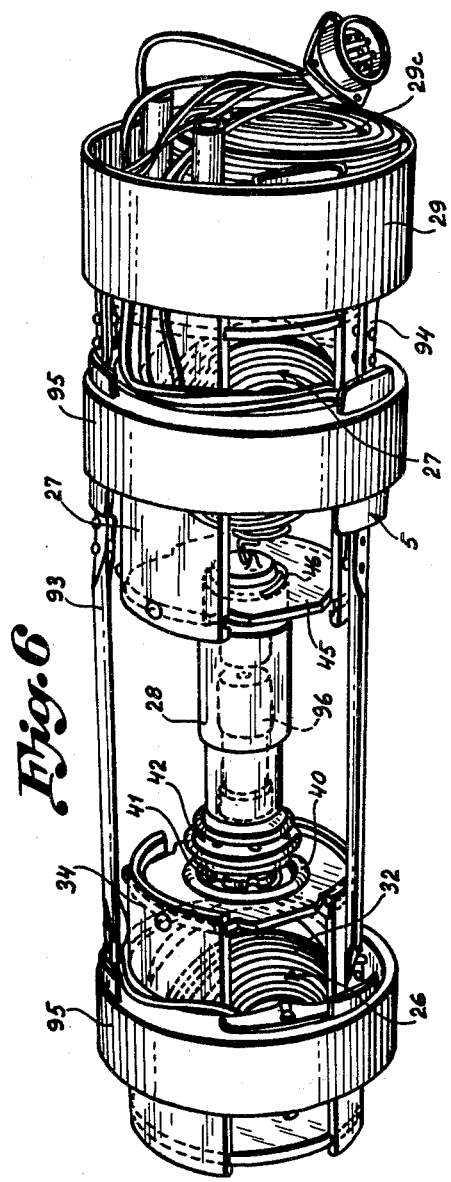

Dec. 18, 1962 K. DRENCK 3,069,547
X-RAY APPARATUS
Filed Jan. 25, 1955 9 Sheets-Sheet 6
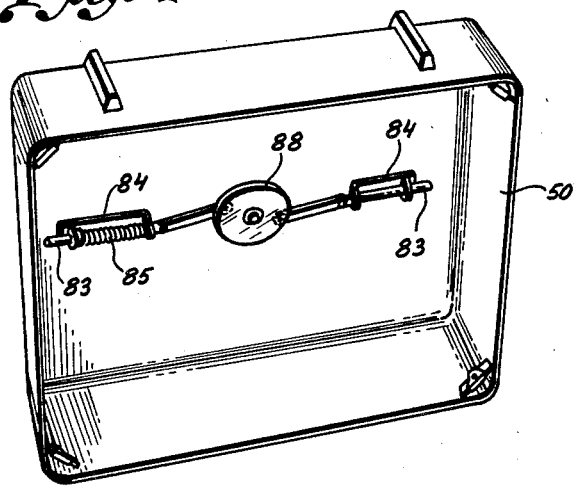
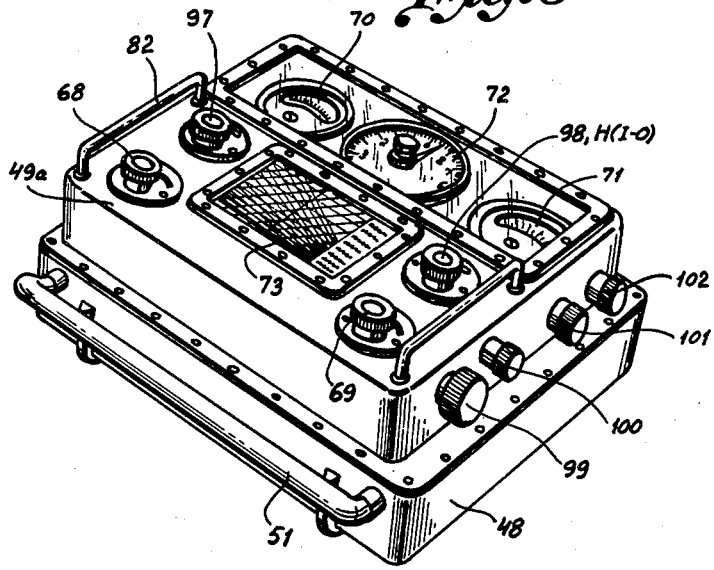

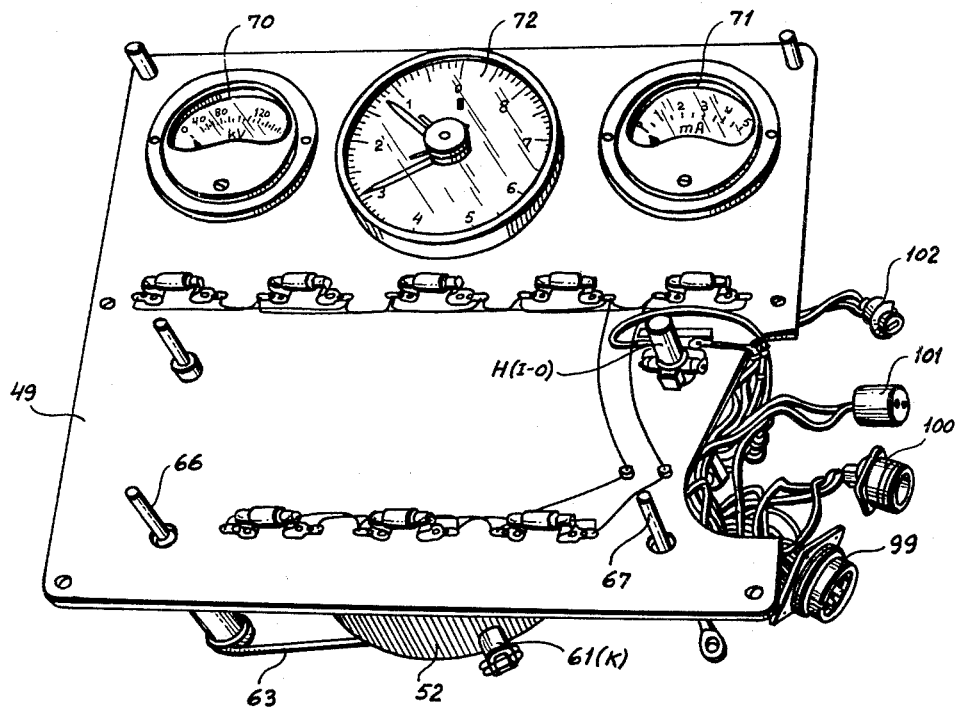

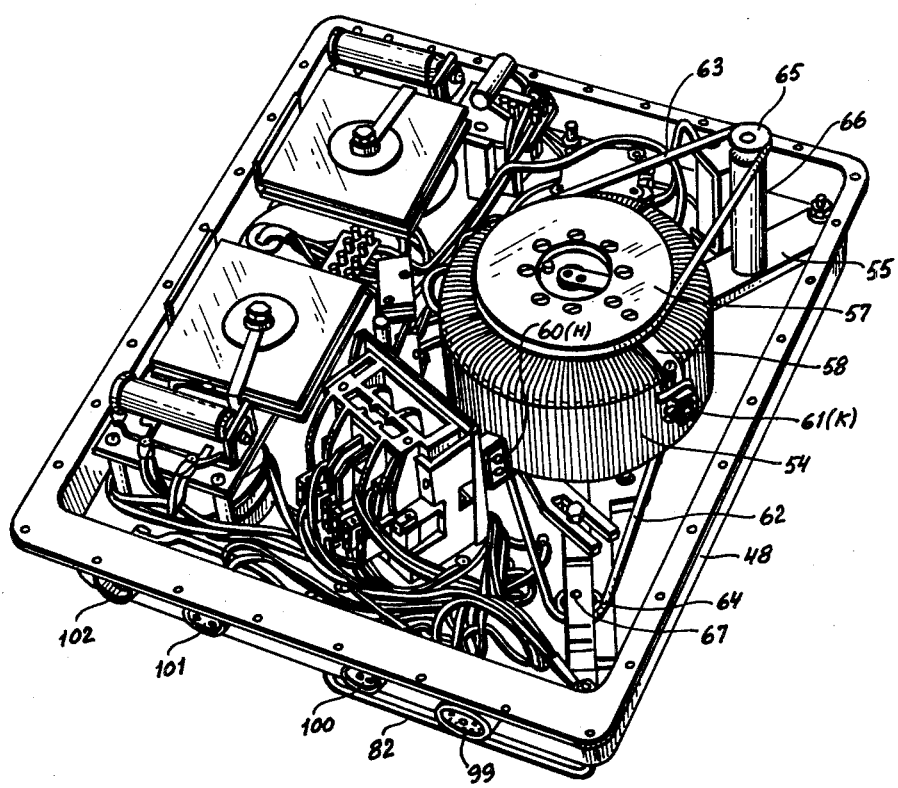

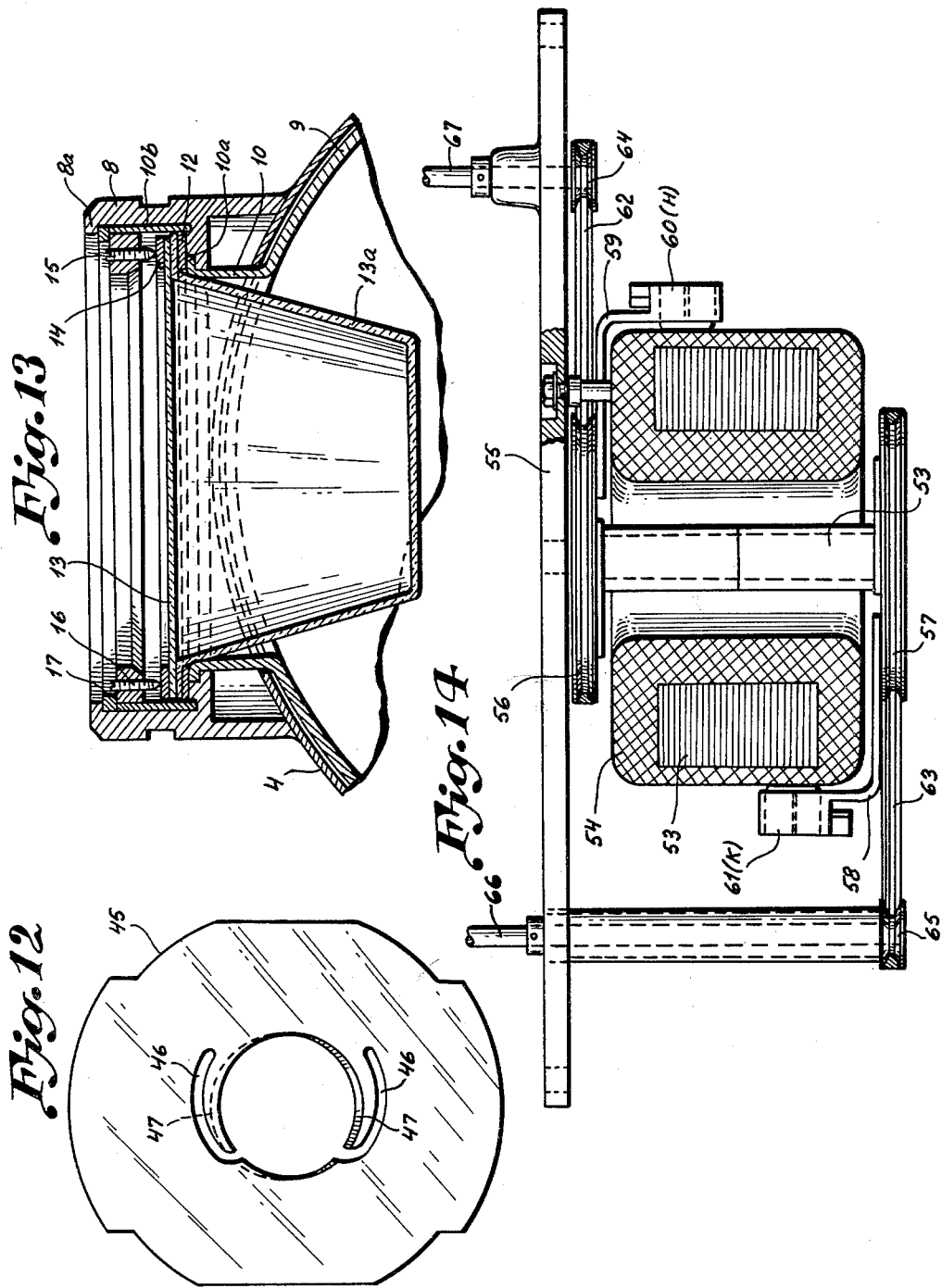

United States Patent Office 3,069,547
Patented Dec. 18, 1962

3,069,547
X-RAY APPARATUS
Kaj Drenck, Naerum, Denmark, assignor to Carl Drenck, 32 Aaboulevarden, Copenhagen, Denmark, a company of Denmark
Filed Jan. 25, 1955, Ser. No. 483,913
Claims priority, application Great Britain Jan. 29, 1954
13 Claims. (Cl. 250—103)

The present invention relates to X-ray apparatus and is more particularly concerned with such apparatus of the kind used for radiographic inspection, for instance inspection of welds or inspection of certain interior details of such articles for instance metal or iron, which may not be inspected otherwise, since they cannot be reached by inspecting tools or let open for visual inspection, without spoiling the articles in question, or endangering the inspecting personnel.

The abovementioned radiographic inspections, which have a still growing influence and importance in modern manufacturing processes, especially those which employ welding operations, may take place under varying conditions and in places very difficult to reach, for instance in ship-yards in the interior of ships on bedding-berths or in the interior of welded storage tanks for petrol etc.

One of the objects of the present invention is to provide an X-ray apparatus of the kind referred to, which in order to fulfill the many different requirements for such apparatus is light, compact and robust in design suitably formed, the apparatus thus being easy to transport even through narrow passages and openings, for instance manholes and easy to place in various positions, so that even difficultly placed welded joints can be radiographed.

Another object of the invention is to provide an apparatus which is easy to connect to normal supply terminals, without using special high voltage cables.

A further object of the invention is to provide an X-ray apparatus of the kind mentioned, which is easy to start and easy to operate even by rather unskilled labour and furthermore, easy to pre-set and adjust to different thicknesses of the materials which are under inspection by the penetrative rays emitted by the apparatus tube.

A still further object of the invention is to provide an X-ray apparatus of the above kind, which in spite of its relatively small weight and small size is very effective in use and which may be used for radiographic steel plates of even relatively large thicknesses, the apparatus being furthermore very reliable and secure in operation, in spite of the high voltages used.

The following is a description by way of example of an apparatus according to this invention with reference to the accompanying drawings in which—

FIG. 1 is a simplified circuit diagram,

FIG. 2 is a more detailed diagram showing the connection of the parts shown in FIG. 1 and the way they are connected in the control circuit.

FIG. 3 is a perspective view showing the X-ray unit and the control panel of an X-ray apparatus, according to the invention, showing the connection between the X-ray unit and the control panel, FIG. 4 is a perspective view showing the X-ray unit placed in a carriage.

FIG. 5 is a perspective view showing the carriage alone,

FIG. 6 is a perspective view showing the X-ray unit with the exterior casing removed.

FIG. 7 is a perspective view showing the cover of the control panel seen from its back.

FIG. 8 is a perspective view showing the control unit with the cover removed.

FIG. 9 shows the mounting plate of the control panel seen from above in perspective view with its top plate removed.

FIG. 10 shows the mounting plate of the control unit seen from below in perspective view.

FIG. 11 is a longitudinal section through the X-ray unit,

FIG. 12 is a view seen in the direction of the arrow II in FIG. 11.

FIG. 13 is a section along the line XIII—XIII in FIG. 11.

FIG. 14 is a section through the regulation transformer.

In broad terms the apparatus according to the invention comprises two independent portable units, of which the one referred to by the numeral 1 in FIG. 3, is a high tension unit containing the X-ray tube, while the other one referred to by 2 is a control panel.

The only connection between these two units is a flexible cable referred to by 91.

As stated above, it is one purpose of the invention to provide an apparatus of the kind referred to, which is decreased in weight. More specifically, the purpose of the invention is to provide an apparatus in which the high tension unit can be decreased in weight because it is that part, which is to be brought into position and carried most around.

In X-ray units of the type described it is necessary to supply the X-ray tube with a filament voltage for heating of the cathode as well as anode voltage. Furthermore, a regulation of the anode voltage must be provided in order to control the emission of the tube. It is not allowed to supply the anode voltage to the tube, unless the cathode is heated and due to the characteristics of the tube, the total high tension voltage must be increased.

According to one feature of the invention the use of a separate filament transformer is avoided and a part of the coil winding of the high tension transformer or a separate winding on the same iron core of the transformer is used for the supply of filament voltage whereby the weight of the X-ray unit is decreased.

With reference to FIG. 1:

A and B are the terminals connecting the apparatus to the supply main, which are normal, for example 220 volts, alternating current main. Across these terminals a winding C of a regulating transformer is connected, the left hand side H1 of which through the lead D in a cable 91, is connected with the one end E1 of the primary winding E in a split-up high tension transformer. A fixed winding $C^1$ is inserted before the regulating winding C of the regulating transformer. The other end of the winding E is connected with one end of the other primary winding F at a common terminal E2 and through a lead G in the flexible cable 91 to a movable tapping or brush H. The other end F1 of the winding F is through another lead J connected with another movable tapping or brush K.

The split-up high tension transformer is furthermore provided with two secondary windings L and M, connected in series and across the X-ray tube N including a cathode N1 and an anode N2.

The filament voltage for the X-ray tube is either as shown taken from a part $L_1$ of the high tension winding L or, if so desired, from a separate winding provided on the iron core on which the windings E and L are provided.

The middle of the high tension transformer windings L and M is earthed at P, in a manner to be more fully described in the following:

From this diagram it will be understood, that when starting the apparatus with both movable contacts H and K near the left hand side of the regulating winding C of the regulating transformer, there is only supplied voltage to the transformer E, L determined by the voltage fraction across the winding $C^1$. When the brush H is moved, the voltage fraction across the winding E increases and when the other brush K is moved across the winding of the regulating transformer C, the other part F, M of the high tension transformer is energized and the high tension can be regulated up to the desired value.

The total voltage is measured by a meter R between the lead D and J. This meter can be calibrated in such a manner as to show in kilo-volts the total high tension across the X-ray tube.

The two portions of the split-up high tension transformer will be described in more detail in the following with regard to the mechanical arrangement provided at either end in the interior of the unit 1.

The actual circuit including the control arrangement is shown in FIG. 2.

The parts already described with reference to FIG. 1 are referred to by the same reference numerals.

The regulating transformer is in the form of a winding provided on an annular iron core (see FIG. 8 for more details). The exterior part of the winding is in the form of a commutator, across which the two movable contacts H and K are allowed to slide in different planes.

In the lead D there is inserted a resistance $D_1$. In each of the leads D and J there is furthermore inserted each of a plurality of contacts that can be operated by a relay winding V. These relay contacts are arranged in series with each of a pair of thermo controlled members $T_1$ and $T_2$, such as bi-metallic members for the operating switch O. This switch O is provided in the control circuit in series with the relay winding V, a switch operable by another relay $V_{max}$, a timer switch $S_T$, a switch $a$, a starter switch I and a switch $b$. From the diagram it will be noted that this control circuit passes from the terminal A to the terminal B. The relay V is furthermore provided with two other contacts, one of which is provided in an auxiliary circuit comprising an extra winding $v$ on the regulating transformer in series with a control lamp $l$.

The fourth switch of the relay V, that is shown nearest to the winding, is provided in a branch lead $h$ connected between the terminal $A^1$ and the lower side of switch O.

Furthermore, opposite directed rectifiers $R_1$ and $R_2$ are provided in both leads D and G each shunted by a resistance $S_1$ and $S_2$. The reason for providing these rectifiers is that the X-ray tube is in form of a direct current load on the secondary side of the high tension transformer, which gives rise to a unidirectional current which energizes only the iron core of the high tension transformer in one direction.

If under these conditions both half waves of the alternating current with which the apparatus is supplied, were allowed to pass through the primary windings of the high tension transformer, an amplification of the magnetic field would be the result of the passage of those half waves, which were in phase with the current in the secondary windings, and such amplification of the magnetic field would give rise to different undesired effects; it has therefore been found convenient to supress such a part of the half waves through the primary transformer, which might give rise to said amplification of the magnetic field.

The relay winding of the relay $V_{max}$. is interposed in series with the two high tension windings and in series with a control meter U, preferably shunted by a small condenser $u$, which serves the purpose of preventing harmonics of higher frequencies from passing through the meter U.

The earth point for the high tension circuit is provided as shown in the middle of the windings of the relay $V_{max}$. so that, irrespectively of the fact that the high tension side of the circuit arrangements has a connection back to the control panel, this will not involve any danger, because the only tension transmitted is the small voltage across the winding $V_{max}$.

The provision of earth in the center of the winding $V_{max}$. also has the advantage that it provides security for operation of this relay in case of irregularities in any of the two high tension sides.

Finally it has to be appreciated that the contact $b$ is in form of a double pole switch, which in its normal starting position is as shown in FIG. 2, but when opened as described in the following, in connection with the operating, will short-circuit the resistance $D_1$.

The apparatus according to the invention consists mainly of: an X-ray unit 1, a control panel 2, and furthermore the apparatus may comprise a carriage 3.

The X-ray unit 1 is shown in FIG. 3, placed in a vertical position and connected with the control panel 2 through the control cable 91 and in FIG. 4 the X-ray unit 1 is shown, placed in a horizontal position on the carriage 3.

The X-ray unit 1 consists of two main parts, namely the exterior casing 4 and the X-ray assembly 5.

The exterior casing 4, which is the only part of the X-ray unit shown in FIGS. 3 and 4 and which is more clearly shown in FIG. 11, has the configuration of a substantially cylindrical tube, which at one end is permanently closed, for example by welding, and which at its other end is closed by a cover 6, welded or in other way secured to the tube.

The casing 4 has in the cylindrical part an opening 7 which is closed by a window structure 8 (see specially FIG. 11). Under the cylindrical part the casing 4 is lined with a lead mantle 9 secured to the casing for example by welding. The lead mantle serves to protect the operator from the X-ray emitted from the anode of the X-ray tube.

The lead mantle 9 has an opening, which corresponds to the opening 7 in the exterior casing and in this opening a rim 10 of the mantle surrounds the hole and is secured to the window structure 8, as will be described more detailedly in the following, with reference to FIG. 13.

The window structure 8 comprises an annular body $8_a$ which is secured to the cylindrical part of the casing 4 for example by welding. The edges 10 of the lead mantle 9 are pressed into internal recesses in said annular body, by means of flanges $10_a$.

A gasket 12 is placed above the flanges $10_a$ and a window 13, for example of a thermo-plastic material, for instance, that known as perspex, is placed above said gasket. The window 13 consists of a cup $13a$ and a cover plate and is kept in a position by means of a washer plate 14, which is pressed against the window by means of tightening screws 15 in a retaining ring 16, kept in position by the spring washer 17. In this way a window structure is provided, which is easy to assemble and efficiently sealed. A lead cylinder $10b$ surrounds the inner side of the cylinder body $8a$.

The casing 4 is at each end provided with interior pockets 18 of which one only is shown to the left in FIG. 11. In these pockets metal inserts 19 are secured for example by tightening nuts.

Handles 21 having rubber protecting rings 22 are secured to said inserts by means of eyebolts or like 92. By removing the eyebolts, the protecting rings 22 may be removed, which may be necessary when the X-ray unit is put in through a manhole. The protecting rings may also be turned as shown in FIG. 3, where the upper protecting ring is turned in the opposite direction of the lower protecting ring.

The X-ray assembly 5 is shown in FIG. 6 and in FIG. 11. It comprises the following main parts: the anode transformer 26, the cathode transformer 27, the X-ray tube 28, the base 29.

The two transformers 26 and 27 and the base 29 are assembled to a unit by means of bars 93, which connect the two transformers and which furthermore contain the electrical conductors connecting said transformers. Short bars 94 connect the base and the cathode transformer. The bars 94 are secured to an annular bearing 95 for the outer transformer core and to the annular wall of the base as shown in FIG. 6.

The anode transformer (see FIGS. 6 and 11) comprises the internal core 31, the transformer windings 32 and the transformer casing 34 which partly surrounds the interior core and the windings and the outer annular transformer core 35 which is mounted in the annular bearing 95.

The transformer casing 34 consists of the two partly cylindrical side-walls 36 and 37 and two end-walls 38 and 39. The end-wall 39 has a cylindrical hole in which a ring 40 for example made by copper is positioned, said ring forming a seat for a helicoidal spring 41. The ring 40 and the helicoidal spring 41 serve to insulate the transformer casing, which preferably is made of thermoplastic material, for example perspex, from the heat of the anode stem 96. A radiator 42 surrounding the anode stem 96 serves to transmit the heat from the anode stem to a heat-conducting and insulating oil with which the casing is filled.

The end-wall 39 of the anode transformer casing 34 is shown in front view in FIG. 12, which illustrates how the cylindrical side-walls 36 and 37 and the end-wall are locked together. While the end-wall 38 has the form of a circular disc, the end-wall 39 has a different form in order to provide a sort of bayonet-locking between the two side-walls and the end-wall 39, as shown in FIG. 12 in connection with the corresponding end-wall 45 of the cathode transformer casing.

The two side-walls 36 and 37 are as mentioned above only partly cylindrical, thereby providing openings, where there is no danger of discharges from the high voltage windings.

The cathode transformer 27 is mainly identical in design with the anode transformer 26, the only difference being that the cathode transformer has filament windings 33 and furthermore that the end-wall 45 of the cathode transformer casing differs from the corresponding end-wall 39 of the anode transformer as will be described hereinafter.

The end-wall 45 of the cathode transformer casing forms a support for the cathode end of the X-ray tube As will be seen from this figure, this end-wall has a cylindrical hole. From the periphery of said cylindrical hole curved cuttings 46 are formed, thereby forming two flaps 47 between said cuttings and the periphery of the cylindrical hole. The flaps 47 are bent slightly inwards and due to the resilient properties of the material used the flaps 47 will provide a resilient grip of the cathode end of the X-ray tube.

The cylindrical hole of the endwall 45 may be inclined relatively to the axis of the unit in order to allow an easy inserting and removal of the X-ray tube, between the two transformer casings.

The base 29 has a short cylindrical wall 29a and an end-wall 29b. The base seals the interior chamber of the outer casing 4 when the X-ray assembly has been inserted into said housing.

Two pipes (not shown) extend through the end-wall 29b of the base 29. One of these pipes is used to establish a vacuum in the interior chamber. The other pipe is used for introducing heat-conducting insulating oil under vacuum into said chamber.

An expansion device 29c forms an extension of the above mentioned oil chamber and allows for the expansion and retraction of the oil. The complete unit formed by the expansion devices and the interior chamber is completely sealed.

The control panel 2 comprises the following main parts: a bottom 48 (FIGS. 8 and 10), a mounting plate 49 (see specially FIG. 9), and a cover 50 (see specially FIG. 7).

The bottom 48 is formed like a box. It has a handle 51 for carrying the control panel and it contains and protects the main equipment of the electrical parts supported on the mounting plate 49.

The mounting plate 49 is seen in plane view in FIG. 9 without its protecting plate 49a. In FIG. 8 the mounting plate 49 is seen in position and equipped with the protecting plate 49a.

In FIG. 10 the mounting plate is seen from the bottom.

On the mounting plate all the electrical parts of the control panel are mounted.

The constructional feature of these electrical parts may vary widely, but mainly standard parts suitable for the desired functions may be used.

The regulating transformer 52 has an annular laminated core and windings 54. The transformer has a cylindrical shaft 53 (see FIGURE 14) which is mounted in a supporting structure secured to the mounting plate by means of bolts. The supporting structure comprises two legs 54 and 55 forming angles with regard to each other.

Two pulleys 56 and 57 are rotatably mounted on the shaft 53 at each end thereof and to each of the pulleys each of a pair of arms 58 and 59 is secured carrying brushes 60 and 61 which slide on the non-insulated portions of the transformer windings.

The pulleys 56 and 57 can be turned by means of belts 62 and 63 and other pulleys 64 and 65. The pulley 65 is mounted on a long shaft 66 in the level of the pulley 57. The pulley 64 is mounted on a short shaft 67, in the level with pulley 56.

As shown in FIG. 9 the shafts 66 and 67 extend through the mounting plate 49, each shaft being provided with handles 68 and 69 respectively.

The handle 68 controls the acceleration tension and the handle 69 controls the filament current, as will be explained in the following:

As shown in FIG. 8, further handles 97 and 98 are provided, the function of which will be described in the following.

Furthermore, a kilo-volt-meter 70, a milli-ampere-meter 71 and a timer 72 are mounted on the base plate.

Three plugs 99, 100 and 101 are positioned on one side of the plate 49a, the plug 99 being designed for the connecting cable 91, the plug 100 for the supply cable and the plug 101 for the 12 volt cable. Aligned with these three plugs, the plate 49a is provided with a plug for a 12 volt fuse. As will be seen from FIG. 8, the plate 49a is equipped with two carrying rails 82. These rails serve to protect the top face of the plate 49a, when the cover 50 is removed and the control panel is operated.

Furthermore, the said rails may be used for carrying the control panel and for locking the cover 50 on the control panel. As shown in FIG. 7, the cover 50 is provided with locking rods 83, which are slidably mounted in bracket 84, secured to the inner side of the cover 50. When the cover 50 is placed on the control panel, the locking rods 83 are retracted by turning a handle connected to a disc 88. During this inwards movement of the locking rods 83 a spring 85, interposed between a collar on one of the locking rods and a collar on the corresponding bearing, will be tensioned.

When released, the spring 85 moves the locking rods 83 outwards to engage under the rails whereby the cover 50 will be locked to the mounting plate.

The carriage 3 (shown in FIGS. 4 and 5) has four legs 103, provided with holes 103a. Slidably mounted on said legs, is a support-unit 104 which consists of a horizontal frame 105 and four inclined square tubes 106 in which the legs may slide. The square tubes and frame 105 are connected through inclined stays 107 in which rolls 108 are rotatably mounted. The inclined stays 107 with the rolls 108 form a seat for the X-ray unit. The support unit has a horizontal bar 109 to which two clamping bands 110, for example resilient steel bands, are connected. The object of these bands is to clamp the X-ray unit in its seat on the support unit and to this end the free ends of the clamping bands 110 are provided with a hole, by means of which the bands may be locked to a locking device 111, turnably mounted on the other of the horizontal bars of the frame 105. Two opposite horizontal bars of the frame 105 are provided with resilient locking devices 112, these include locking pins which engage the holes 103a of the legs 103—thus the support unit 105 may be secured to the legs 103 in different heights. The support-unit may also be completely removed from the legs and used as an independent support for the X-ray unit in cases where this unit must be introduced, for example into steam boilers or employed in different heights along a ship's sides. Two of the legs are provided with removable rollers as shown in FIG. 4 which may be replaced by runners as shown in FIG. 5.

The operation of the equipment is as follows:

As already explained the control panel has four handles, one 97 for the main switch, one 98 switch $H_{I-O}$ for starting the apparatus, and two 68 and 69 respectively, for moving each of the two brushes of the regulating transformer.

The regulating transformer is so formed, that the brushes are allowed to move down to a point that corresponds to something like only 40% of full voltage. In the normal starting position both handles 68 and 69 are turned to the lowest bringing the two brushes H and K in the position corresponding to the abovementioned lowest voltage. This also puts contacts $a$ and $b$ in the position shown in FIG. 2.

The control handle 98 for the switch $H_{I-O}$ is movable in the opposite directions from a neutral position in which the switch I is opened, while the switch O is closed. By moving the handle in one direction it closes the switch I, while switch O remains closed. The switch O is only opened by moving the handle in opposite direction beyond the neutral position.

The apparatus is started by moving the control handle 98 to close the switch I after the timer has been set to the desired exposure time which closes the switch $S_T$.

Hereby the relay winding V is energized and closes the four contacts which connects the control circuit with the transformer. The closing of the contact which is shown nearest to the relay winding closes the branch from the lower end of the switch O to the lead A' so as to establish a by-pass circuit for holding the relay, when the contacts $a$ and $b$ are opened.

Closing of this contact also provides a circuit for the timer motor $M_T$, which is arranged in a circuit branch between the lead B' and the holding circuit branch.

It will be understood that in this position with the brushes H and K still in the minimum position, the minimum fraction of voltage from the regulation transformer is supplied to the primary transformer windings E through the circuit including the lead G and the lead D and the starter resistance $D_1$ the purpose of which is to eliminate the initial shock through the winding E. Also the circuit to the second transformer winding F is closed, but no tension is supplied to this circuit, until the brush K is moved to supply the second voltage fraction.

When the handle 68 controlling the brush H, is moved the initial movement opens the switches $a$ and $b$ and throws the switch $b$ over to short circuit the starter resistance $D_1$. The brush H is moved until the desired voltage fraction is supplied to the transformer winding E thereby, as already explained in connection with FIG. 1 the X-ray tube is energized with a filament current as well as approximately half of the high tension voltage. The remaining high tension voltage is then regulated by the handle 69, which moves the brush K.

Under normal operating conditions nothing happens hereafter until the timer has run out, and opens the timer switch $S_T$ which opens the whole control circuit and de-energizes the relay winding V with the result that all four relay contacts are opened.

In the case of disturbances of equilibrium on the high tension side relatively to the point P and current will flow through the relay $V_{max.}$ which in such event will be energized and open the relay contact whereby the circuit of the relay V be de-energized, in the same manner as by the opening of the time switch.

It is also possible for the operator to shut off the apparatus by means of the control handle 98 by turning this handle beyond the neutral position to open the switch O.

It will be appreciated that in any case where the control circuit has been opened either by means of the timer switch ST, the relay $V_{max.}$ contact or the contact O it is impossible to start the apparatus again without moving the control handles 68 and 69 to the initial position of the brushes, because both the contacts $a$ and $b$ have to be closed before the relay V can be energized again.

From the above description of the X-ray apparatus, the circuit arrangements therefor and the mechanical outfit, it will be understood that an important feature of the invention resides in providing the two voltage fractions or electromotive forces by means of which the split up transformer windings are energized in such a manner that the sum of them can be varied but will remain constant when the ratio between them is varied. Thus if the brush K has been adjusted to give the desired high tension anode voltage on the X-ray tube, the filament voltage can be varied independently thereof by varying the position of the brush H.

In practice a stop will be provided for limiting the position of the brush H to substantially such a position in which the transformer E, L delivers half of the anode voltage for the X-ray tube.

As explained, a fixed portion of the regulating transformer winding is always included in the control circuit. Accordingly, even a small movement of the brush H from its "off" position sufficient to close the contact $a$ to start the apparatus will always result in that an electromotive force is delivered to the transformer E, L so that there is no risk for damage even if the movable contact K should immediately thereafter be moved to supply the whole fraction of voltage to the transformer F, M. In this event the tube will not have sufficient filament voltage, but the remaining filament voltage can be regulated independently by means of the brush H for the reasons mentioned here.

In practice the apparatus will be started in that way that the brush H is moved so far that the milliamperemeter U shows the allowable secondary circuit current as specified in the instructions or slightly therebelow. Then the brush K is moved until the kilovoltmeter R shows the desired high tension voltage also specified in the instructions. Then a final adjustment is made by the brush H so as to adjust the meter U to show exactly the desired secondary circuit current corresponding to the desired emission.

The operation conditions described are also advantageous on account of the possible individual regulation of the emission by means of the brush H, because it enables the entire equipment to use different X-ray tubes having different characteristics and requiring different filament current for the same emission.

It will be understood that the invention is not limited to the specific embodiment shown and described and that various modifications are possible within the scope of the invention.

It will be understood that the important feature of the invention resides in deriving a low tension fraction from that transformer portion which is connected with the cathode side of the X-ray tube. Hereby a separate filament current transformer is avoided which contributes highly toward decreasing the weight of the transportable high tension unit including the X-ray tube. It will be understood by those skilled in the art that the filament current can be derived from this transformer portion in another manner than just tapping off the high tension winding. Another possibility is to provide a separate winding on that transformer portion and further possibilities can from common knowledge be selected by those skilled in the art.

Though the mechanical arrangement has been shown and described with reference to an embodiment in which the two half parts of the split transformer are provided on each of a pair of separate iron cores, it will be understood that also this arrangement can be modified so as to have a single iron core only, on which the split windings are provided.

It will be appreciated that it is not necessary to run the entire equipment from a normal alternating current mains having a standard frequency of 50 or 60 cycles, and it will be appreciated that in order to reduce the necessary amount of iron in the transformers preferably a higher operating frequency may be selected. In such cases as well as in the case of the use of a standard main frequency one single elongated iron core for both split transformer windings can be used having yoke portions extending on either side of the X-ray tube and traverse core portion provided in either end of the exterior container.

Although the voltage divider has been referred to as a regulating transformer, it will be understood by those skilled in the art that the invention is not limited to the use of a regulatable autotransformer. In the broadest aspect of the invention, the electromotive forces supplied to the split up transformer windings can be delivered by two independent voltage sources.

Although in connection with the high tension unit simple transformers have been shown and described, it will be understood that the word "transformers," as used in connection with these parts of the high tension unit, is to be interpreted in its broadest sense so as to also comprise combination of transformers with other suitable means such as condensers and resistances capable for example of doubling or otherwise increasing the voltage on the secondary side. Such combined arrangements are well known in various electronic arrangements and can easily be designed by those skilled in the art.

Certain parts are not referred to in any greater detail because they do not form part of the invention and are well known to those skilled in the art. Thus, for example, the expansion device 29d may simply be in form of a corrugated tubular member of any suitable material such as soft brass, synthetic rubber, a suitable thermoplastic material or any other suitable material adapted to provide an expansion chamber to receive the increased volume of oil in the exterior container, which arises when the oil is heated, and collapse again to conform to the volume of oil when that is reduced upon cooling.

Also the timing arrangement can easily be selected as an equipment obtainable from dealers or factories specialized in making such equipments. Such timing arrangements are used in many other fields for exposure time control in connection with photographic equipment for controlling curing time in hydraulic presses and in various other fields.

I claim:

1. A regulating apparatus for thermionic tubes having an incandescent cathode and an anode, said apparatus comprising a pair of transformers for energizing the tube, at least one of said transformers including a secondary winding for supplying filament current to said incandescent cathode, one of said transformers including a secondary winding adapted for being coupled to said anode, said transformers including primary windings, a common terminal connecting said primary windings, a pair of exterior terminals respectively connected to said primary windings, and a voltage regulating transformer connected to said common terminal and including a pair of contacts connected to said primary windings and having sliding contact, toward and away from each other, along said regulating transformer whereby the said primary windings may counteract each other upon selected operation of said regulating transformer.

2. A regulating apparatus as claimed in claim 1, in which one of the exterior terminals of one of said primary windings is connected to one of the sliding contacts engaging the regulating transformer, and said common terminal is connected to the other of the sliding contacts, the two sliding contacts being movable past each other on said regulating transformer.

3. X-ray equipment comprising a control unit adapted to be connected with a voltage supply and including means for supplying a limited variable fraction of the voltage of said voltage supply across a first pair of output terminals and means for supplying a second fraction of said supply voltage to be added to said limited variable voltage fraction across a second pair of output terminals, a relay in said control unit including switch means selectively operable to isolate voltage supply and the first said means and an electromagnetic winding operable to actuate said switch means, said X-ray equipment further comprising an X-ray unit including an X-ray tube having a filament-type cathode and an anode, first transformer means including a primary and a secondary winding, means for deriving a voltage fraction from said first transformer means for heating said cathode of said X-ray tube, second transformer means including a primary and a secondary winding, a series connection between the primary windings of said first and said second transformer means and a series connection between the secondary windings of said first and said second transformer means in series with said X-ray tube, said X-ray equipment further comprising a flexible cable connectable to supply said limited variable voltage fraction across said first primary winding of said first transformer means and to supply said second fraction of said supply voltage across the primary winding of said second transformer means, said flexible cable further comprising a pair of feed-back wires connecting said secondary windings in series with said relay winding of said relay in said control unit and a current measuring meter included in series with said relay winding.

4. X-ray equipment comprising a control unit adapted to be connected with a supply voltage and including means for supplying a limited variable fraction of said supply voltage across a first pair of output terminals and means for supplying a second fraction of said supply voltage to be added to said limited variable voltage fraction across a second pair of terminals, means for independently varying each of said voltage fractions, said X-ray equipment further comprising an X-ray unit including an X-ray tube having a filament-type cathode and an anode, first transformer means including a primary and a secondary winding, means for deriving a voltage fraction from said first transformer means for heating said cathode of said X-ray tube, second transformer means including a primary and a secondary winding, a series connection between the primary windings of said first and said second transformer means and a series connection between the secondary windings of said first and said second transformer means in series with said X-ray tube, said X-ray equipment further comprising a flexible cable connectable to supply said limited variable voltage fraction across said first primary winding of said first transformer means and to supply said second fraction of said supply voltage across the primary winding of said second transformer means and means coupled to said primary transformer windings to rectify current passing therethrough.

5. In X-ray equipment including an X-ray tube having a filament-type cathode and an anode in combination: a primary supply circuit adapted to be connected with a voltage source, a variable auto transformer, split transformers including a pair of primary windings connected to and shunted across said auto transformer, said split transformers including secondary windings in series with said X-ray tube, one of said split transformers including means for supplying a voltage fraction to heat said cathode, at least one manually operable switch in said supply circuit, rectifier means between said auto transformer and said primary windings, a control circuit operable to close and break said supply circuit and comprising time control switch means, a relay in said control circuit, switch means in said supply circuit coupled to and adapted to be closed upon energizing of said relay in said control circuit, said time control switch in said control circuit being operable to de-energize said relay winding to open said switch means in said supply circuit, means manually adjustable to preset the opening time of said time control switch, a control circuit branch including a switch coupled to and adapted to be closed upon energizing of said relay, said control circuit branch being coupled to and adapted to initiate operation of said timer means to open said time control switch after expiration of said preset time, said supply circuit being coupled to said control circuit branch and including at least one switch adapted to be opened in response to increase of said first fraction of said voltagle divider, manually operable control means for connecting a variable fraction of said auto transformer across said primary windings and manually operable control means for connecting a limited variable fraction of said auto transformer across the primary winding of said split transformer from which the cathode heating voltage is supplied.

6. In X-ray equipment including an X-ray tube having a filament-type cathode and an anode in combination: a primary supply circuit adapted to be connected with a suitable voltage source, a variable auto transformer, split transformers including a pair of primary windings shunted across said auto transformer, said split transformers including secondary windings in series with said X-ray tube, one of said split transformers including means for deriving a voltage fraction to heat said X-ray cathode, at least one manually operable switch in said supply circuit, a control circuit coupled to and adapted to close and break said supply circuit and comprising time control switch means, a relay in said control circuit, switch means in said supply circuit operable to be closed upon energizing of said relay in said control circuit, said time control switch means in said control circuit being operable to de-energize said relay winding to break said supply circuit, means manually adjustable to preset the opening time of said time control switch means, a control circuit branch including a switch operable to be closed upon energizing of said relay, said control circuit branch being coupled to and adapted to open said time control switch means after expiration of said preset time interval, said supply circuit being coupled to said control circuit branch and including at least one switch adapted to be opened in response to an increase of said first fraction of said voltage divider, manually operable control means for connecting a variable fraction of said auto transformer across said primary windings and manually operable control means for connecting a limited variable fraction of said auto transformer across the primary winding from which the cathode heating voltage is supplied.

7. In an X-ray equipment having an X-ray tube and including a filament-type cathode and an anode in combination: an X-ray unit including said X-ray tube and a pair of energizing transformers including primary windings connected in series and secondary windings connected in series with said X-ray tube to deliver anode voltage therefor, one of said transformers including means for deriving a voltage fraction and being connected to supply said voltage fraction as filament voltage for said X-ray tube, a control unit to said X-ray unit connectable therewith by means of an elongated cable and including a regulating transformer adapted to be connected to a supply mains and a pair of movable brushes for tapping voltage fractions from said regulating transformer, a control circuit arrangement inclding said regulating transformer and being adapted for supplying a first variable voltage fraction to said one transformer which is connected to deliver filament voltage to said X-ray tube, and a secondary voltage fraction to the other of said transformers, first means variable at will for moving one of said brushes to vary said first voltage fraction so as to vary said filament voltage and the anode voltage of said X-ray tube, and second means variable at will for moving the other of said brushes to vary said second voltage fraction independently of said first voltage fraction for varying the total anode voltage of said X-ray tube.

8. X-ray apparatus comprising an X-ray tube including a filament-type cathode and an anode in combination, a pair of high voltage transformers each including a primary winding and a secondary winding, the primary windings being connected in series, the secondary windings being connected in series across said X-ray tube, one of said transformers including a portion connected to supply filament voltage to said X-ray tube cathode, a voltage supply arrangement for said primary windings comprising an annular regulating transformer including a fixed tapping and a first and a second movable brush operable to derive a first and a second variable voltage fraction from said regulating transformer, said regulating transformer being connected to a voltage source, a circuit arrangement for connecting said fixed tapping to one end of said series connected primary windings, the first of said movable brushes to the other end of said series connected primary windings and the second of said movable brushes between said primary windings, a voltage meter for measuring the voltage between said fixed tapping and said first brush, first means operable at will for moving said first brush, second means operable at will for moving said second brush independently of said first brush, and means for supplying each of said primary windings individually with said variable voltage fractions so as to add said voltage fractions for producing an anode voltage for said X-ray tube and to vary said voltage fractions for regulating the filament voltage of said X-ray tube.

9. An X-ray equipment comprising a tubular casing, an X-ray tube including a filament-type cathode and two high voltage transformers mounted in said tubular casing with said transformers in spaced relationship on each side of said X-ray tube, said transformers including primary windings connected in series and secondary windings connected in series to provide a high voltage supply, one of said transformers including means for deriving a voltage fraction to be used as filament voltage for said X-ray tube, a control panel comprising a voltage supply, control circuit arrangement and an electrical cable operable to connect said control circuit arrangement with said transformer primary windings, said control circuit including a regulating transformer including a fixed tapping adapted to be connected to said primary windings for supplying a potential thereto and a pair of variable tappings movable to derive a variable voltage fraction from said regulating transformer and each connectable to said primary windings to supply said voltage fraction thereto for energizing said primary windings with the sum of said voltage fractions and one of said transformer windings with one of said voltage fractions only, and manually operable control means for independently varying said voltage fractions by moving said variable tappings independently of each other.

10. An X-ray tube apparatus comprising a high voltage unit including a casing, an X-ray tube in said casing and including a filament-type cathode and two high voltage transformers including primary windings connected in series and secondary windings connected in series to provide a high voltage supply, one of said transformers including means for deriving a voltage fraction to be used as filament voltage for said X-ray tube, said transformer being mounted in said casing on opposite sides of said X-ray tube, a control unit comprising a voltage supply and control circuit arrangement including a regulating transformer having an exposed contact surface, a fixed tapping connected to said primary windings for supplying a potential thereto, and a pair of variable tappings each movable along said exposed contact surface in different planes and each operable to derive a variable voltage fraction from said regulating transformer and each connectable to said primary windings to supply said voltage fractions thereto for energizing said primary windings with the sum of said voltage fractions and one of said primary windings with one of said voltage fractions only, and manually operable control means for independently varying said voltage fractions by moving said variable tappings independently.

11. For use in connection with an arrangement including an X-ray tube having a filament-type cathode and two hight voltage transformers having their primary windings connected in series and their secondary windings connected in series to provide a high voltage supply and in which one of said transformers has means for deriving a voltage fraction to be used as a filament voltage for said X-ray tube: an improved voltage supply and control circuit arrangement including a regulating transformer having an exposed contact surface, a fixed tapping adapted to be connected to said primary windings for supplying a potential thereto, and a pair of variable tappings each movable across said exposed contact surface in different planes and each operable to derive a variable voltage fraction from said regulation transformer, a control circuit operable to be energized and including relay means operable to connect said fixed tapping and said movable tapping to said primary windings to supply said voltage fractions thereto for energizing said primary windings with the sum of said voltage fractions and one of said transformer windings with one of said voltage fractions only and manually operable control means for independently varying said voltage fraction by moving said variable tappings independently.

12. For use in connection with an arrangement including an X-ray tube having a filament-type cathode and two high voltage transformers having their primary windings connected in series and their secondary windings connected in series to provide a high voltage supply and in which one of said transformers has means for deriving a voltage fraction to be used as a filament voltage for said X-ray tube: an improved voltage supply and control circuit arrangement including a regulating transformer adapted to be energized from a voltage source and having an exposed winding, a fixed tapping in said regulating transformer and connected said primary windings, a pair of variable tappings each arranged for movement in contact with said exposed winding and being connected to said primary windings so as to supply each of these with each of two variable voltage fractions derived from said regulating transformer between said fixed tapping and each of said variable tappings, a control circuit including relay means operable to establish transformer circuits between said fixed tapping and said movable tappings to said primary windings to supply said voltage fractions thereto for energizing said primary windings, a resistance included in said transformer circuits, means operable to short-circuit said resistance in response to movement of one of said variable tappings from a predetermined position to increase one of said voltage fractions, and manually operable control means for independently moving said variable tappings.

13. For use in connection with an arrangement including an X-ray tube having a filament-type cathode and two high voltage transformers having their primary windings connected in series and their secondary windings connected in series to provide a high voltage supply, and in which one of said high voltage transformers has means for deriving a voltage fraction to be used as a filament voltage for said X-ray tube: an improved voltage supply and control circuit arrangement including a voltage supply circuit comprising a regulating transformer including an exposed winding, a fixed tapping and a pair of variable tappings each movable across said winding to derive a pair of variable voltage fractions from said regulating transformer and said high voltage transformer primary windings connected to said regulating transformer tappings to supply respective of said variable voltage fractions across each of said primary windings and the sum of said voltage fractions across the series connected primary windings, rectifier means included in said voltage supply circuit, and a control circuit arrangement including switch means operable at will for energizing said control circuit, means operable in response to such energization to close said voltage supply circuit, means operable to de-energize said control circuit in response to expiration of a predetermined time period, and means operable in response to such de-energization to open said voltage supply circuit.

References Cited in the file of this patent

UNITED STATES PATENTS

| | | |
|---|---|---|
| 1,965,249 | Morrison | July 3, 1934 |
| 2,447,955 | Millholland et al. | Aug. 24, 1948 |
| 2,605,458 | Zabransky | July 29, 1952 |
| 2,829,272 | Ball | Apr. 1, 1958 |

FOREIGN PATENTS

| | | |
|---|---|---|
| 608,646 | Great Britain | Sept. 17, 1948 |